United States Patent [19]
Jones et al.

[11] Patent Number: 5,031,592
[45] Date of Patent: Jul. 16, 1991

[54] ENGINE CYLINDER HEAD WITH AUGMENTED AIR OR AIR/FUEL MIXTURE FLOW AND METHOD

[76] Inventors: Sam Jones; Jeff Jones, both of R.R. #2, Sunnyside Rd., Washington, Ind. 47501

[21] Appl. No.: 419,613

[22] Filed: Oct. 10, 1989

[51] Int. Cl.$^5$ .................... F02B 31/00; F02B 41/00; F01L 3/00
[52] U.S. Cl. .................................. 123/308; 123/26; 123/188 M
[58] Field of Search ............... 123/308, 306, 585, 432, 123/52 MV, 26, 188 M

[56] References Cited

U.S. PATENT DOCUMENTS

| | | | |
|---|---|---|---|
| 2,804,862 | 9/1957 | Nedwidek | 123/188 M |
| 3,097,633 | 7/1963 | Klean | 123/188 M |
| 3,313,278 | 4/1967 | Thompson | 123/188 M |
| 3,650,261 | 3/1972 | Hutsell | 123/26 |
| 3,874,357 | 4/1975 | List et al. | 123/188 M |
| 4,060,061 | 11/1977 | Wright | 123/26 |
| 4,466,397 | 4/1984 | Kato et al. | 123/188 M |
| 4,568,265 | 2/1986 | Firey | 123/26 |
| 4,686,944 | 8/1987 | Hiraoka et al. | 123/32 MV |
| 4,726,337 | 2/1988 | Yoshida | 123/308 |

Primary Examiner—Raymond A. Nelli
Attorney, Agent, or Firm—Robert R. Keegan

[57] ABSTRACT

There is disclosed an internal combustion (V-8) engine having an improved form of cylinder head and intake manifold for augmented combustion air flow and improved fuel mixing wherein the intake chamber immediately upstream of the intake valve is provided with two inlet ducts rather than the usual one inlet duct. The primary inlet duct may be conventional; the secondary inlet duct branches off in a direction more nearly parallel to the central axis of the cylinder and preferably connects to an inlet pipe which draws air through an independent air filter. The secondary inlet duct is provided with its own butterfly valve which can be independently controlled either automatically or manually and may be provided with a fuel injector. Secondary inlet ducts of the system can be attached on the outside to the inlet stacks (for injected engines), to an air breather base (on carbureted engines), or to draw filtered air from the atmosphere directly into the system. Engines as disclosed thus are less sensitive to the natural intake pulses caused by inlet valve opening and closing and have better resistance to reversion of the intake flow.

7 Claims, 4 Drawing Sheets

ENGINE CYLINDER HEAD WITH AUGMENTED AIR OR AIR/FUEL MIXTURE FLOW AND METHOD

The present invention relates to improvements in cylinder heads for automotive internal combustion engines. In the preferred embodiments disclosed the invention is directed primarily to four-cycle V-8 high performance engines for racing cars or the like, but may have application to other internal combustion engines where fuel economy, reduced air pollution and other factors may be more important. It should be noted that the present invention is not primarily directed to supercharged engines but rather to engines in which the fuel-air mixture is supplied by induction.

It is of course well known that the power produced by an internal combustion engine is limited by the quantity (mass) of combustion air supplied for each power stroke of its cylinders. More generally the combustion air supplies the oxidizer (oxygen) which is required for combustion of the hydrocarbon fuel, and optimum or complete combustion will not be attained if the ratio of fuel to oxidizer exceeds a fixed ratio determined by the chemical composition of those components.

Numerous approaches have been taken to improving performance of internal combustion engines by supplying them with more air (oxidizer), among them ram superchargers, turbo superchargers, enlargement of fuel air ducts and enlargement of carburetor throats.

All such expedients have certain disadvantages, for example, turbo superchargers are complicated devices which may be the source of mechanical problems, even with careful maintenance, and in addition require substantial power which to some extent must reduce the power available for driving the vehicle. Also there are complicated classification rules for race car engines which prevent one from utilizing all the available power enhancing expedients and still keep within a particular racing car engine classification.

The distinctly different approach of the present invention for air flow enhancement is to provide two separate inlet ducts to the inlet chamber and inlet valve of each engine cylinder. One of these inlet ducts may be conventional in size and shape while the second inlet duct will normally be somewhat smaller and, in a V-8 engine, will approach from a direction more nearly parallel to the central axis of the engine cylinder. In a V-8 engine the conventional inlet ducts approach the cylinder head from the inside of the V; the secondary inlet ducts provided according to the invention will typically approach the head from the outside of the V and can be about horizontal or slightly below horizontal due to the slant of the engine cylinder. Accordingly the inlet pipe connecting to each inlet duct will typically be of arcuate shape subtending an angle of 90° or ore so that the air received by the secondary inlet ducts is drawn from a level substantially above the engine head.

The secondary inlet ducts provided by the present invention are functional and effective when they provide only air without admixture of fuel because the desired quantity of fuel may readily be supplied in the air stream to the primary inlet ducts; thorough mixing of the air streams from the primary and secondary ducts occurs due to their opposed relationship and the turbulence existing in the inlet chamber and the piston itself. While the theoretical explanation for their operation is not fully known, it is believed that the augmentation of air flow by the secondary inlet ducts is at least as effective and probably more effective than if the cross sectional area of the primary ducts was increased by an amount equal to the cross sectional area of the secondary inlet duct.

In certain instances it may be desirable to provide either carburetors or fuel injectors to mix fuel with the air supplied through the secondary inlet ducts of the invention. Whether or not fuel is admixed with the air drawn through the secondary inlet ducts it is contemplated that the secondary inlet duct and pipe will be provided with a butterfly valve or other means for controlling the quantity of air flow. In rare cases the butterfly valve could be omitted to increase air flow at the expense of losing control of low volumes of air. This valve can be simply linked mechanically to operate with the valves for the primary inlet air through the conventional inlet ducts or it may be controlled automatically in whole or in part in accordance with engine operating conditions or requirements. Of course the secondary inlet butterfly valves could be controlled separately by manual operation if desired.

In addition to providing the above described features and advantages it is an object of the present invention to provide an improved form of cylinder head for internal combustion engines with an induction air supply wherein the air from a conventional inlet duct is augmented by air from a secondary inlet duct approaching the inlet chamber from a different direction than that of the conventional inlet duct.

It is another object of the present invention to provide such an improved form of cylinder head wherein the air streams from the conventional inlet ducts and secondary inlet ducts enter the inlet chamber from substantially opposite directions.

It is yet another object of the present invention to provide such an improved cylinder head and air intake structure for internal combustion engines wherein the quantity of air flowing through the secondary inlet duct is controlled by a valve capable of separate control from the air valve for the air passing through the conventional inlet port.

It is still another object of the present invention to provide such an improved form of cylinder head and air intake structure further including means such as a fuel injector or a carburetor for mixing liquid fuel with the air stream passing through the secondary inlet duct.

Other objects and advantages of the invention will be apparent from consideration of the following description in conjunction with the appended drawings in which.

Figure 1:
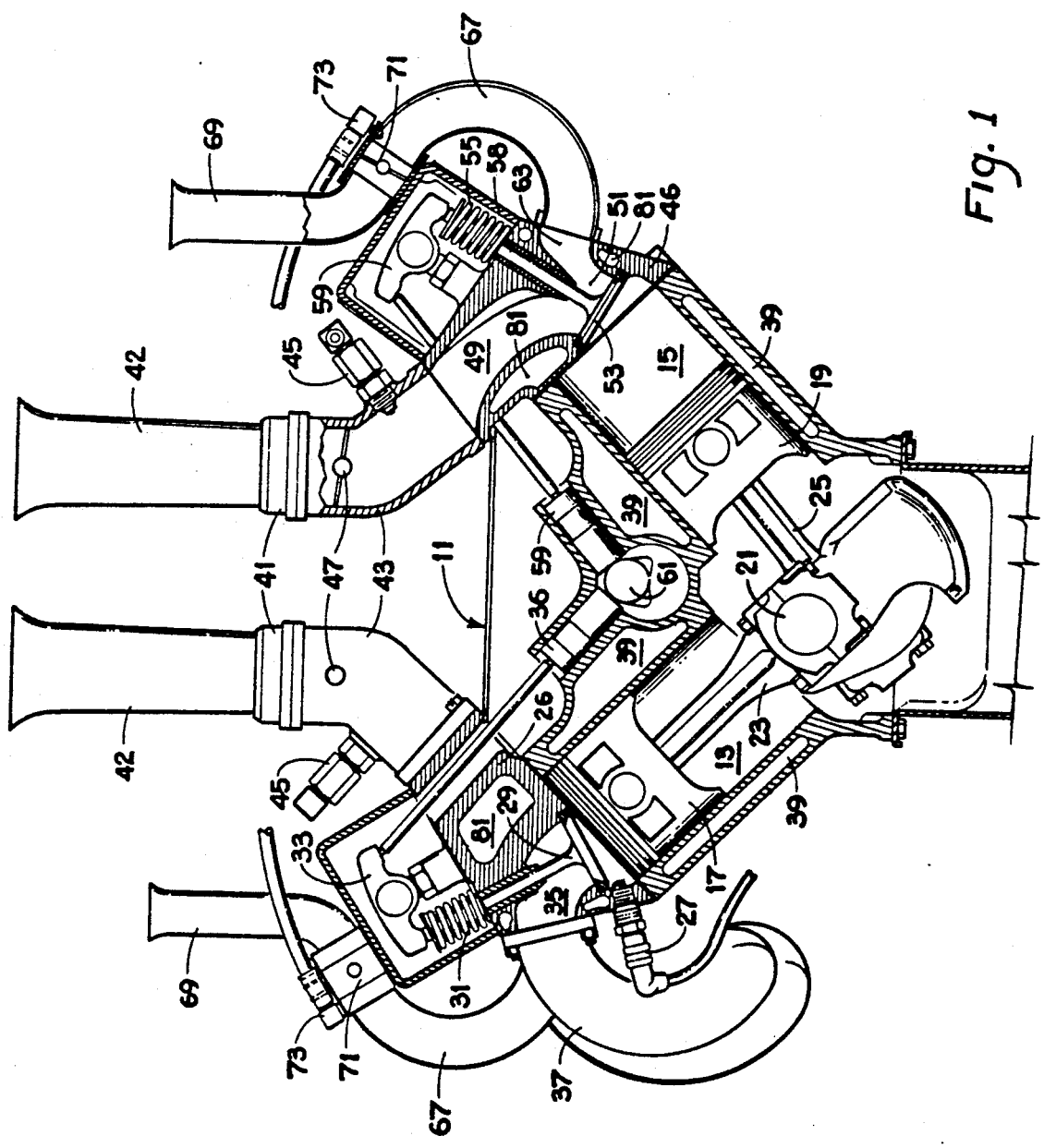
FIG. 1 is a front elevational view of a V-8 engine according to the invention, broken away to better show the air inlet structure.
Figure 2:
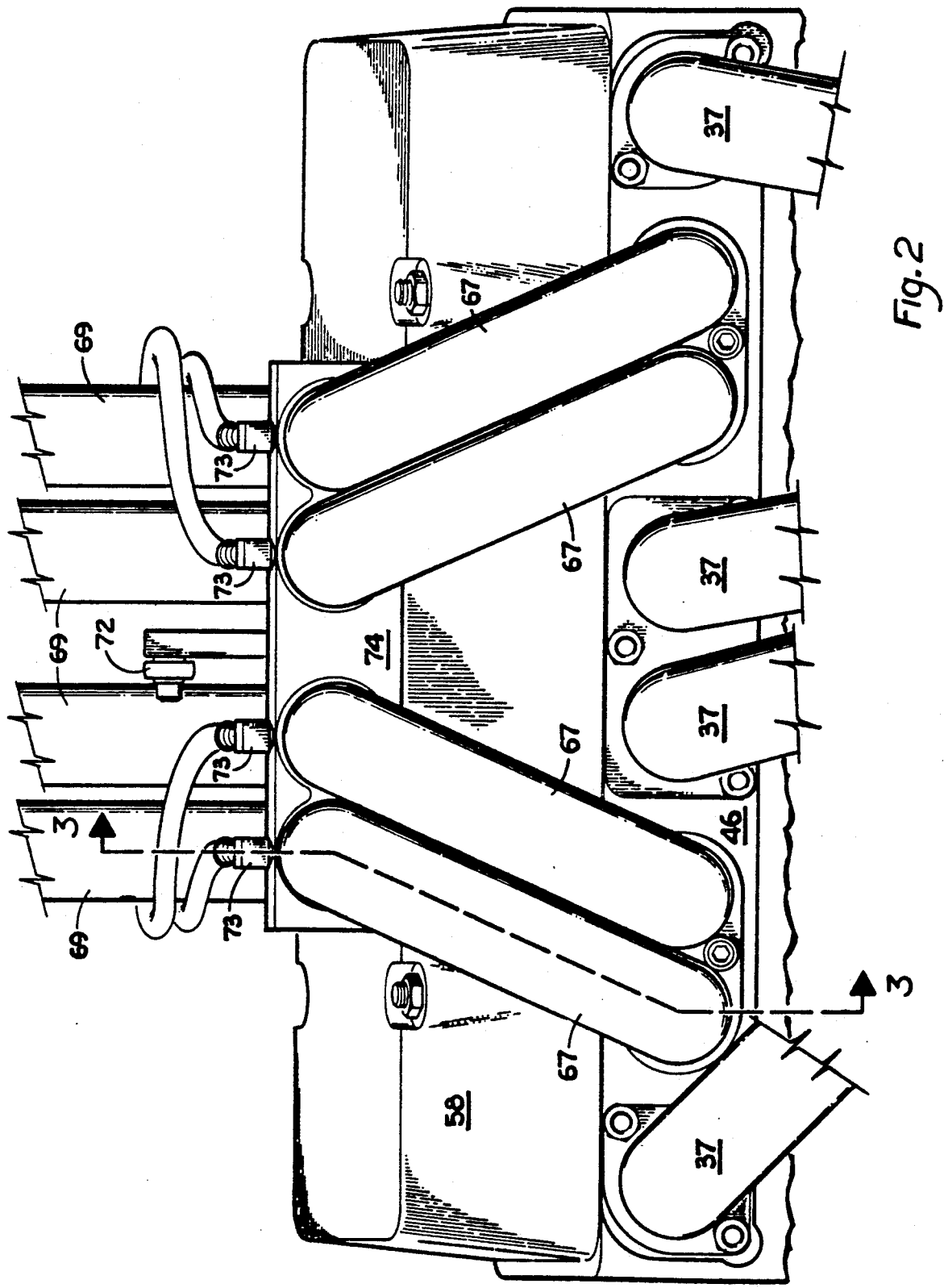
FIG. 2 is a side elevational view of a cylinder head and associated structure according to the invention.
Figure 3:
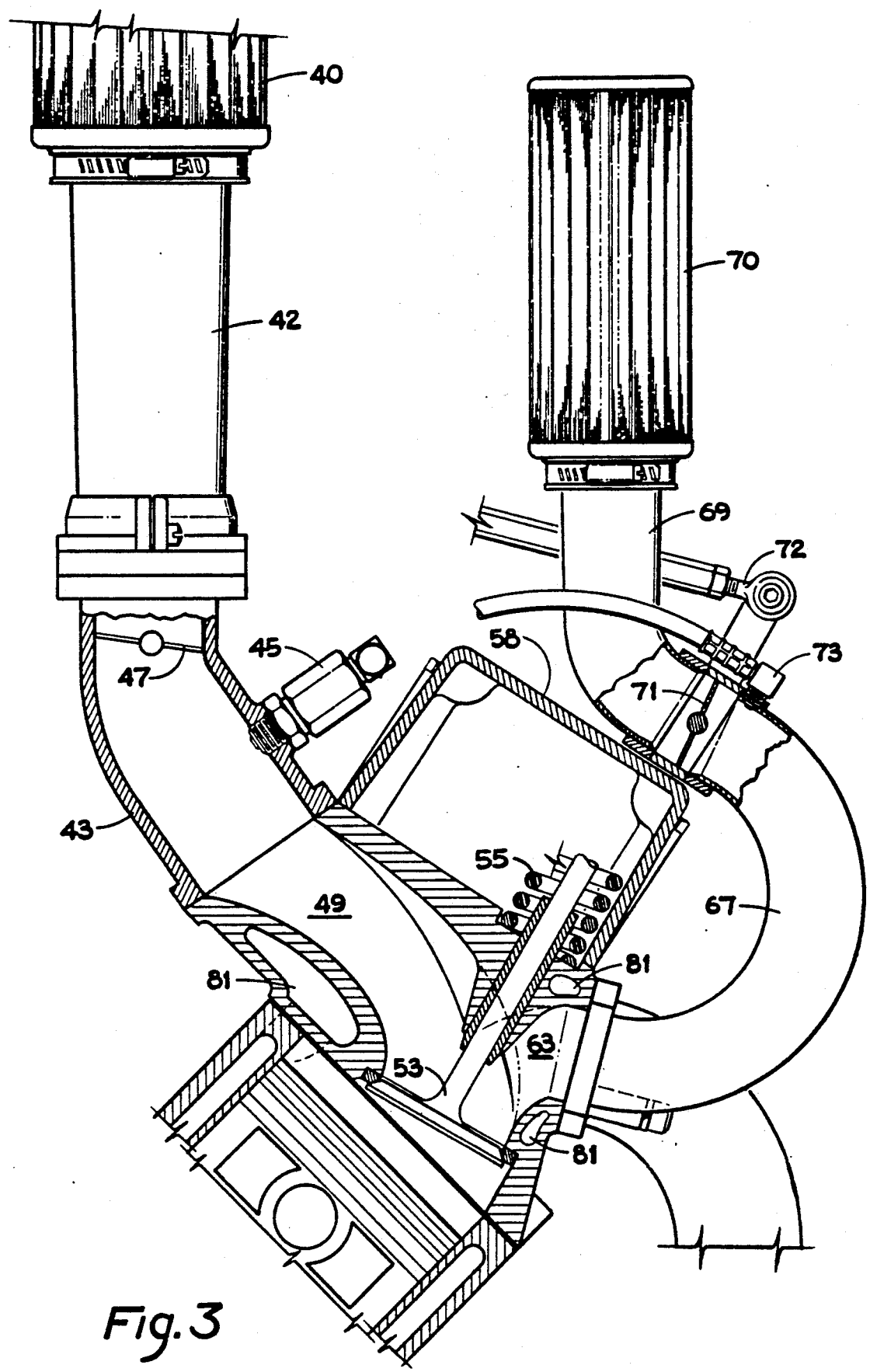
FIG. 3 is a fragmentary, partially sectional view taken along the line 3—3 in FIG. 2.

Before alluding to the individual drawings it will be helpful to discuss certain background information in detail relating to automotive internal combustion engines. We are primarily concerned here with engines which have four or more cylinders. Commonly an intake manifold for such an internal combustion engine utilizes a design which employs independent runners or pipes that distribute air (sometimes admixed with fuel) from a common plenum, or plenums, to the intake ports of the cylinder heads. Usually a cylinder head will service at least two cylinders and there will be an intake port for each cylinder which the cylinder head services.

It should be noted that the plenums which feed the manifold pipes or runners are typically associated with respective carburetors and/or air filters. If the number of carburetors or the number of air filters is increased to equal the number of cylinders of the engine, then the manifold becomes a collection of independent pipes or runners that do not have a "common" plenum. Although this arrangement does not exactly fit the dictionary definition of manifold, the arrangement will still be commonly referred to as a manifold.

There are normally physical design requirements such as restrictions as to manifold height, width and length so that the intake manifold is a compromise in design for power, fuel consumption, drivability, throttle response, and smoothness of operation. It is a practical impossibility for the air-fuel mixture to flow in a direct, straight path to the cylinder with the necessary curvature in the path commonly approaching 90°, and there may be other irregularities that are not conducive to ultimate efficiency. Internal combustion engines especially high output race car engines, should have more air and fuel volume of a correct mixture than previous manifold and cylinder head designs will allow.

According to the present invention a conventional cylinder head is modified to have an additional intake port for each cylinder which leads through an inlet duct to the inlet chamber and the intake valve for the cylinder. This intake port will commonly be on the opposite side of the cylinder head from the conventional intake port. Since the discussion will usually involve V-type engines, the conventional intake port will be referred to as the inside port and the secondary intake port according to the invention will be referred to as the outside port, or the external port. This novel cylinder head design allows the fuel-air mixture to each cylinder to be augmented by air or fuel-air mixture from a manifold which mounts outside the engine or attaches to the side of the cylinder head or block and connects to the outside intake ports.

The features of the invention are subject to modification and various combinations thereof can be chosen for different purposes such as racing, economy, high torque, and maximum horsepower. Usually air flow through the outside or secondary manifold will be controlled by butterfly valves or the like in conjunction with control of the primary air-fuel mixture to the conventional intake ports. However, in some instances where maximum horsepower is desired unregulated flow through the secondary or outside manifold may be provided; in such case economy and drivability obviously should not be important factors.

Referring now to the drawings and particularly to FIG. 1 a V-type engine 11 is shown, which for purpose of discussion will be considered to be a V-8 engine. The engine shown is generally conventional except for the cylinder heads and manifolds.

Cylinders 13 and 15 of the engine have central axes at right angles to one another, and pistons 17 and 19 are connected to a crank shaft 21 by connecting rods 23 and 25, all in a conventional manner.

Cylinder 13 is provided with a spark plug 27 and exhaust valve 29, exhaust valve spring 31, rocker arm 33 and exhaust valve cam follower 36 in a conventional manner. Cylinder head 26 for cylinder 13 has an exhaust duct 35 leading from the port for valve 29 to exhaust manifold 37. Similar elements are provided for cylinder 15 but are not shown in FIG. 1. Engine 11 is provided with cavities 39 forming a water cooling jacket for the engine block.

Cylinder 15 is functionally equivalent to cylinder 13 and essentially a mirror image thereof. An intake manifold 41 for the engine includes inlet pipes 43 connecting to the cylinder heads 26 and 46; conventional vertical intake stacks 42 feed intake air to manifolds 41; stacks 42 may incorporate an air filter 40. The engine 11 illustrated in FIG. 1 is a fuel injected engine and injectors 45 are provided in inlet pipes 43. Conventional butterfly valves 47 are provided for controlling air flow through manifolds 41 and inlet pipes 43. A conventional inlet duct 49 in cylinder head 46 connects to inlet pipe 43 to provide a passage for intake air to intake chamber 51 for intake valve 53. Intake valve 53 is provided with a conventional valve spring 55, rocker arm 57 and cam follower 59. Cam follower 36 and cam follower 59 operate off overhead cams 61 in a conventional manner. The apparatus thus far described is generally conventional apparatus of known design.

Figure 4:
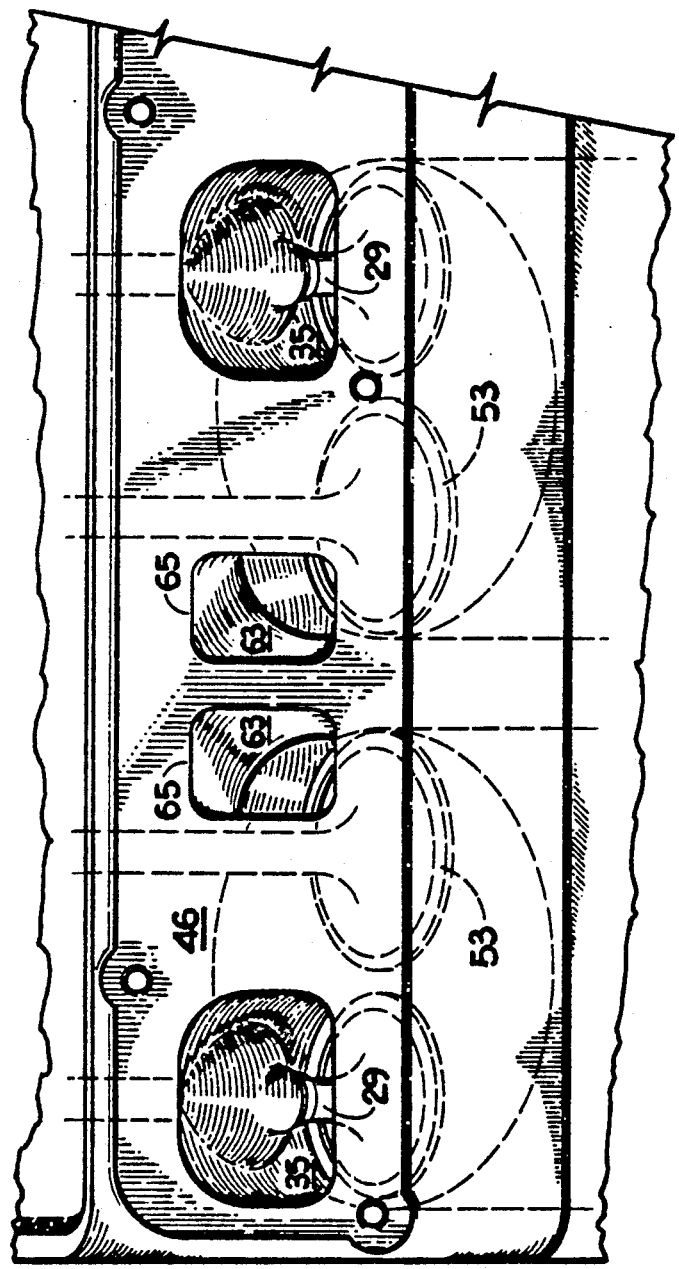
FIG. 4 is a fragmentary side elevational view of a cylinder head according to the invention with exhaust and auxiliary inlet openings uncovered.

It will be noted that the inlet chamber 51 for cylinder 15 is provided with a secondary inlet duct 63 which leads to an opening 65 on the outside of cylinder head 46 as best seen in FIG. 4. The opening 65 and secondary inlet duct 63 communicate with a secondary inlet pipe 67 which curves back over cylinder head 46 where it connects to a secondary intake stack 69. Secondary stack 69 may incorporate a replaceable air filter 70. The portion of cylinder head 26 serving cylinder 13 is provided with similar features which do not show in FIG. 1 except for secondary inlet pipe 67 and secondary intake stack 69. In the embodiment illustrated in FIG. 1 a butterfly valve 71 is provided for controlling the air flow through each of the secondary inlet pipes 67, and these valves are controlled through mechanical link 72 in unison with butterfly valves 47 as a part of the fuel-air control system for the engine. In a simpler embodiment of the engine, butterfly valve 71 could be omitted with a sacrifice of airflow control at low rpm's; however, elimination of butterfly valve 71 would somewhat increase the maximum achievable airflow through secondary inlet pipe 67 and secondary inlet duct 63.

In the embodiment illustrated in FIG. 1 fuel injectors 73 are provided for secondary inlet pipes 67, but in many cases such fuel injectors would be omitted from the engine fuel system. In general, and in racing car engines in particular, there is seldom a problem in delivering enough fuel for a proper air-fuel mixture and performance is limited rather by the quantity of air that can be delivered. For this reason fuel injector 73 may not be effective in increasing engine performance and could then be omitted.

Cylinder heads 26 and 46 are provided with water cooling channels 81 communicating with channels 39 as customary; the water cooling channels 81 must of course avoid the additional passages in the cylinder heads represented by the secondary inlet ducts 63.

The present invention has been described as applied to a particular form of engine with a specific type of air-fuel system. However, the invention is not limited to application with only this type of engine and air-fuel system, and except for supercharged air-fuel systems, the invention will be applicable to a wide variety of engines and air-fuel systems.

It will be apparent to those skilled in the art that the engine described and illustrated could equally well have a carburetor air-fuel system rather than the fuel injectors 45 and 73 as illustrated. In such case the air would be received in a suitable manifold (replacing manifold 41) from one or more multi-barrel carburetors with their associated air filters. The elimination of main fuel injectors 45 would not necessarily preclude the use of fuel injector 73 in secondary inlet pipes 67. It is contemplated in most cases that fuel injectors 73 would be eliminated along with fuel injectors 45 however. It is also possible to use carburetors to supply a fuel mixture to inlet pipe 67; such carburetors could be separate from the main carburetors or fuel air mixture could be drawn into secondary inlet pipe 67 from the main intake manifolds.

As previously mentioned, it is believed to be advantageous for the primary inlet duct 49 and the secondary inlet duct 63 to feed into the inlet chamber 51 from opposite directions; this is believed to produce a better mixture of the fuel with the air. However the particular opposed arrangement of primary inlet duct 49 and secondary inlet duct 63 in the cylinder head as shown in FIG. 1 is not the only arrangement by which the invention can be carried out.

As previously mentioned the applicability of the invention is not limited to V-8 engines or even to V-type engines and inline engines or other engine configurations could readily benefit from the enhanced air-fuel induction provided by the present invention. While the invention is thought to be most beneficial for engines utilizing liquid fuels, the invention may readily be adapted to gas fuel engines.

In addition to the variations and modifications to the invention which have been described or suggested above, other variations and modifications will be apparent to those skilled in the art and accordingly the scope of the invention is not to be considered limited to the particular embodiments and modifications shown or suggested but is rather to be determined by reference to the appended claims.

What is claimed is:

1. The method of providing a fuel-air mixture with an augmented supply of induction fed air to cylinders of an internal combustion reciprocating engine having a cylinder head with primary inlet ducts for conducting combustion air to intake valves of said cylinders comprising the steps of providing fuel mixed with air to said primary inlet ducts upstream of said intake valves, and providing air through secondary inlet ducts in said cylinder head upstream of said intake valves with an air flow direction generally opposite to that of the air flow through corresponding ones of said primary inlet ducts, and controlling the rate of air flow through said secondary inlet ducts.

2. The method recited in claim 1 further including the step of filtering air entering said secondary inlet ducts and wherein said air entering said secondary inlet ducts is at no more than ambient pressure.

3. The method recited in claim 1 further including the step of mixing fuel with the air flowing in said secondary inlet ducts.

4. The method recited in claim 3 further including the step of filtering air entering said secondary inlet ducts.

5. The method recited in claim 1 wherein the rate of air flow through said secondary inlet ducts is controlled independently of any control of fuel mixed with air provided to said primary inlet ducts.

6. The method recited in claim 5 further including the step of mixing fuel with the air flowing in said secondary inlet ducts.

7. The method recited in claim 6 further including the step of filtering air entering said secondary inlet ducts.

* * * * *